(12) United States Patent
Oshiumi (10) Patent No.: US 9,286,015 B2
(45) Date of Patent: Mar. 15, 2016

(54) PRINTING APPARATUS, PRINTING METHOD, AND COMPUTER READABLE MEDIUM

(71) Applicant: FUJI XEROX CO., LTD., Tokyo (JP)

(72) Inventor: Makoto Oshiumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/522,028

(22) Filed: Oct. 23, 2014

(65) Prior Publication Data

US 2015/0355872 A1      Dec. 10, 2015

(30) Foreign Application Priority Data

Jun. 10, 2014    (JP) .................................. 2014-119571

(51) Int. Cl.
*G06F 3/12*    (2006.01)
(52) U.S. Cl.
CPC ............ *G06F 3/1267* (2013.01); *G06F 3/1205* (2013.01); *G06F 3/126* (2013.01); *G06F 3/1271* (2013.01); *G06F 3/1292* (2013.01)
(58) Field of Classification Search
CPC ..... G06F 3/1263; G06F 3/1205; G06F 3/126; G06F 3/1271; G06F 3/1292; G06F 3/1267; H04N 1/00923; H04N 1/00954; H04N 2201/0039
USPC ......................................................... 358/1.14
See application file for complete search history.

(56) References Cited

U.S. PATENT DOCUMENTS

| | | | | |
|---|---|---|---|---|
| 2009/0046319 | A1* | 2/2009 | Fukusada .............. | G06F 3/1285 358/1.15 |
| 2010/0165973 | A1* | 7/2010 | Su et al. ........................ | 370/345 |
| 2014/0368867 | A1* | 12/2014 | Kim et al. .................... | 358/1.15 |
| 2015/0116746 | A1* | 4/2015 | Park ...................... | G06F 3/1263 358/1.13 |

FOREIGN PATENT DOCUMENTS

JP    4459385 B2    4/2010

* cited by examiner

*Primary Examiner* — Iriana Cruz
(74) *Attorney, Agent, or Firm* — Oliff PLC (57) ABSTRACT

A printing apparatus includes a printing data storing unit and a printing order adjusting unit. The printing data storing unit stores received printing data. The printing order adjusting unit adjusts an order of printing of printing data received through short-range radio communication to be higher than an order of printing of printing data stored in the printing data storing unit.

7 Claims, 9 Drawing Sheets

| PRINTING ORDER | JOB ID | USER NAME | JOB TYPE | COMMUNICATION UNIT | DATA SIZE |
|---|---|---|---|---|---|
| 1 (IN-PROGRESS) | 81434813 | USER A | NORMAL PRINTING | WIRED | 500 KB |
| 2 | 81364694 | USER B | AUTHENTICATION PRINTING | WIRELESS 1 | 122 KB |
| 3 | 32456869 | USER B | AUTHENTICATION PRINTING | WIRELESS 1 | 35 KB |
| 4 | 31343667 | USER B | AUTHENTICATION PRINTING | WIRELESS 1 | 524 KB |
| 5 | 32446896 | USER C | NORMAL PRINTING | WIRED | 87 KB |
| 6 | 18964486 | USER D | NORMAL PRINTING | WIRED | 783 KB |
| ... | ... | ... | ... | ... | ... |

| IP ADDRESS | PRINTER NAME | JOB STORAGE STATUS | PRINTING FUNCTIONS | | | |
|---|---|---|---|---|---|---|
| | | | COLOR OUTPUT | DOUBLE-SIDED PRINTING | N-UP PRINTING | ... |
| 11.22.33.4 | PRINTER A | 5 (300 KB) | ○ | ○ | ○ | ... |
| 11.22.33.5 | PRINTER B | 3 (800 KB) | ○ | ○ | ○ | ... |
| 11.22.33.6 | PRINTER C | 0 (0 KB) | × | ○ | × | ... |
| 11.22.33.6 | PRINTER D | 0 (0 KB) | ... | × | × | ... |
| ... | ... | ... | | | | |

| PRINTING ORDER | JOB ID | USER NAME | JOB TYPE | COMMUNICATION UNIT | DATA SIZE |
|---|---|---|---|---|---|
| 1 (IN-PROGRESS) | 81434813 | USER A | NORMAL PRINTING | WIRED | 500 KB |
| 2 | 81364694 | USER B | AUTHENTICATION PRINTING | WIRELESS | 122 KB |
| 3 | 32456869 | USER B | AUTHENTICATION PRINTING | WIRELESS | 35 KB |
| 4 | 31343667 | USER B | AUTHENTICATION PRINTING | WIRELESS | 524 KB |
| 5 | 32446896 | USER C | NORMAL PRINTING | WIRED | 87 KB |
| 6 | 18964486 | USER D | NORMAL PRINTING | WIRED | 783 KB |
| ... | ... | ... | ... | ... | ... |

| PRINTING ORDER | JOB ID | USER NAME | JOB TYPE | COMMUNICATION UNIT | DATA SIZE |
|---|---|---|---|---|---|
| 1 (IN-PROGRESS) | 81434813 | USER A | NORMAL PRINTING | WIRED | 500 KB |
| 2 | 43846677 | USER W | NORMAL PRINTING | WIRELESS DIRECT | 328 KB |
| 3 | 81364694 | USER B | AUTHENTICATION PRINTING | WIRELESS | 122 KB |
| 4 | 32456869 | USER B | AUTHENTICATION PRINTING | WIRELESS | 35 KB |
| 5 | 31343667 | USER B | AUTHENTICATION PRINTING | WIRELESS | 524 KB |
| 6 | 32446896 | USER C | NORMAL PRINTING | WIRED | 87 KB |
| 7 | 18964486 | USER D | NORMAL PRINTING | WIRED | 783 KB |
| ... | ... | ... | ... | ... | ... |

| PRINTING ORDER | JOB ID | USER NAME | JOB TYPE | COMMUNICATION UNIT | DATA SIZE |
|---|---|---|---|---|---|
| 1 (IN-PROGRESS) | 81364694 | USER B | AUTHENTICATION PRINTING | WIRELESS | 122 KB |
| 2 | 32456869 | USER B | AUTHENTICATION PRINTING | WIRELESS | 35 KB |
| 3 | 31343667 | USER B | AUTHENTICATION PRINTING | WIRELESS | 524 KB |
| 4 | 32446896 | USER C | NORMAL PRINTING | WIRED | 87 KB |
| 5 | 18964486 | USER D | NORMAL PRINTING | WIRED | 783 KB |
| ... | ... | ... | ... | ... | ... |

| PRINTING ORDER | JOB ID | USER NAME | JOB TYPE | COMMUNICATION UNIT | DATA SIZE |
|---|---|---|---|---|---|
| 1 (IN-PROGRESS) | 81364694 | USER B | AUTHENTICATION PRINTING | WIRELESS | 122 KB |
| 2 | 32456869 | USER B | AUTHENTICATION PRINTING | WIRELESS | 35 KB |
| 3 | 31343667 | USER B | AUTHENTICATION PRINTING | WIRELESS | 524 KB |
| 4 | 43846677 | USER W | NORMAL PRINTING | WIRELESS DIRECT | 328 KB |
| 5 | 32446896 | USER C | NORMAL PRINTING | WIRED | 87 KB |
| 6 | 18964486 | USER D | NORMAL PRINTING | WIRED | 783 KB |
| ... | ... | ... | ... | ... | ... |

PRINTING APPARATUS, PRINTING METHOD, AND COMPUTER READABLE MEDIUM

CROSS-REFERENCE TO RELATED APPLICATIONS

This application is based on and claims priority under 35 USC 119 from Japanese Patent Application No. 2014-119571 filed Jun. 10, 2014.

BACKGROUND

Technical Field

The present invention relates to a printing apparatus, a printing method, and a computer readable medium.

SUMMARY

According to an aspect of the invention, there is provided a printing apparatus including a printing data storing unit and a printing order adjusting unit. The printing data storing unit stores received printing data. The printing order adjusting unit adjusts an order of printing of printing data received through short-range radio communication to be higher than an order of printing of printing data stored in the printing data storing unit.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention (hereinafter, referred to as this exemplary embodiment) will be explained with reference to figures.

Functional Configuration

Figure 1:
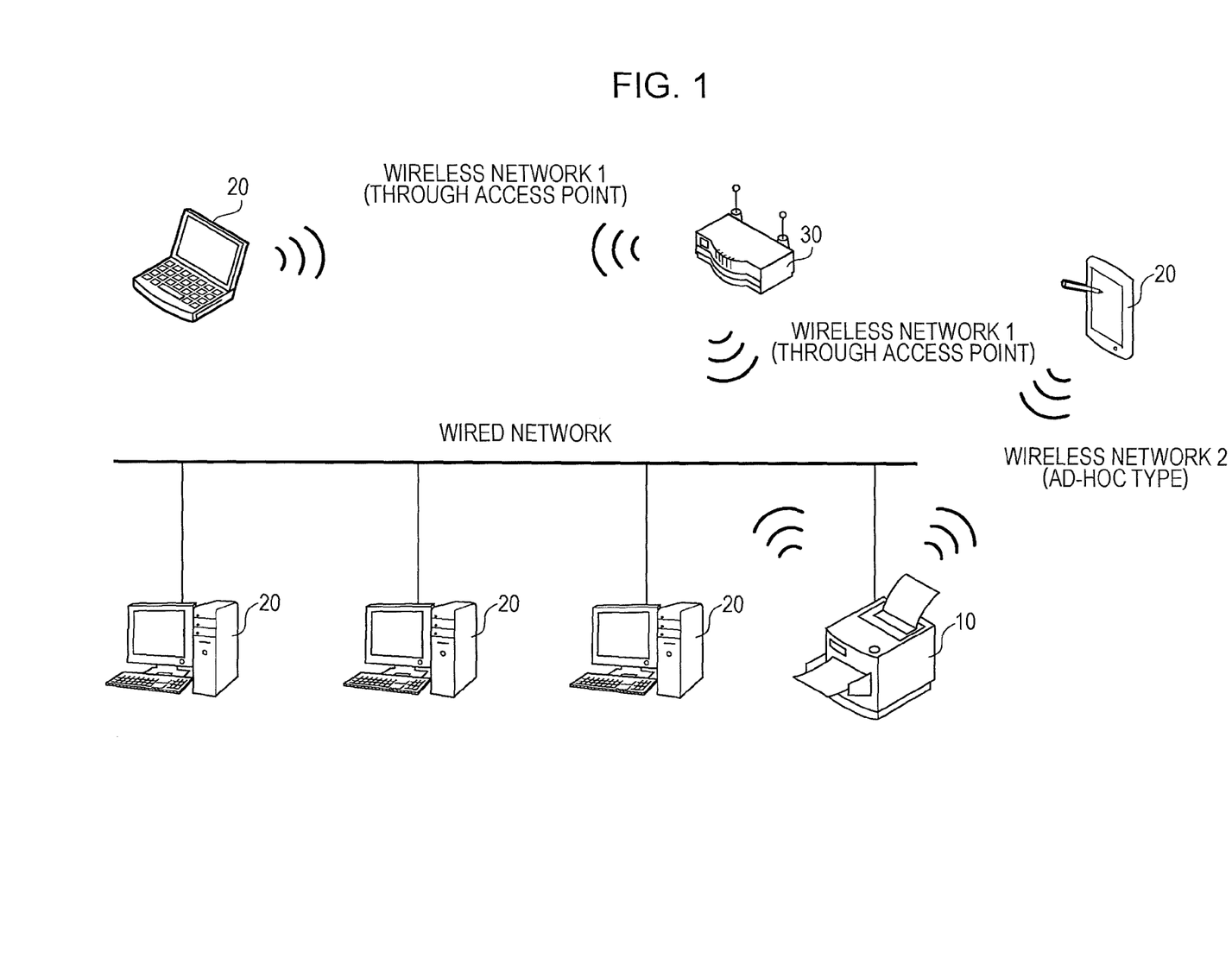
FIG. 1 is a diagram illustrating an example of a system configuration according to an exemplary embodiment.

FIG. 1 is a diagram illustrating an example of a system configuration according to this exemplary embodiment. As illustrated in FIG. 1, a printing apparatus 10 (hereinafter, may be simply referred to as a printer) is connected to plural terminals 20 via a wired network and a wireless network. The wired network may be Ethernet®. However, the wired network is not limited to this. The wireless network includes a wireless network 1 through an access point 30, such as a wireless local area network (LAN) router, and an ad-hoc wireless network 2 over which terminals are directly connected to each other for updates without through the Ethernet® or the access point 30. The wireless network 2 may employ, for example, a communication method, such as Wireless Fidelity (Wi-Fi®) direct (hereinafter, referred to as "wireless direct") and Bluetooth®. However, the wireless network 2 is not limited to them. The printing apparatus 10 receives printing data from the terminals 20 via the wired network and the wireless networks 1 and 2, and performs printing. In this exemplary embodiment, the printing apparatus 10 is able to receive printing data concurrently from plural communication units over networks. As described later, the printing apparatus 10 has a function to store therein received plural pieces of printing data as print jobs and to adjust the order of printing of the print jobs.

The wired network and the wireless network 1 are networks established as infrastructures inside an office or the like and they are collectively called an infra network or private network. In general, only terminals at which users who work at the office or the like are registered, are able to be connected to the infra network. In contrast, the wireless network 2 is used for short-range radio communication, and is a network used when a user who is not able to be connected to the infra network wants to temporarily use the printing apparatus 10. The wireless network 2 may be used, for example, when a guest user, such as a customer who visits the office or an employee who belongs to a different office, wants to print documents before a meeting, a conference, and the like. Offices include a hotel, an airport, a city hall, a hospital, and the like, as well as a corporation.

Figure 2:
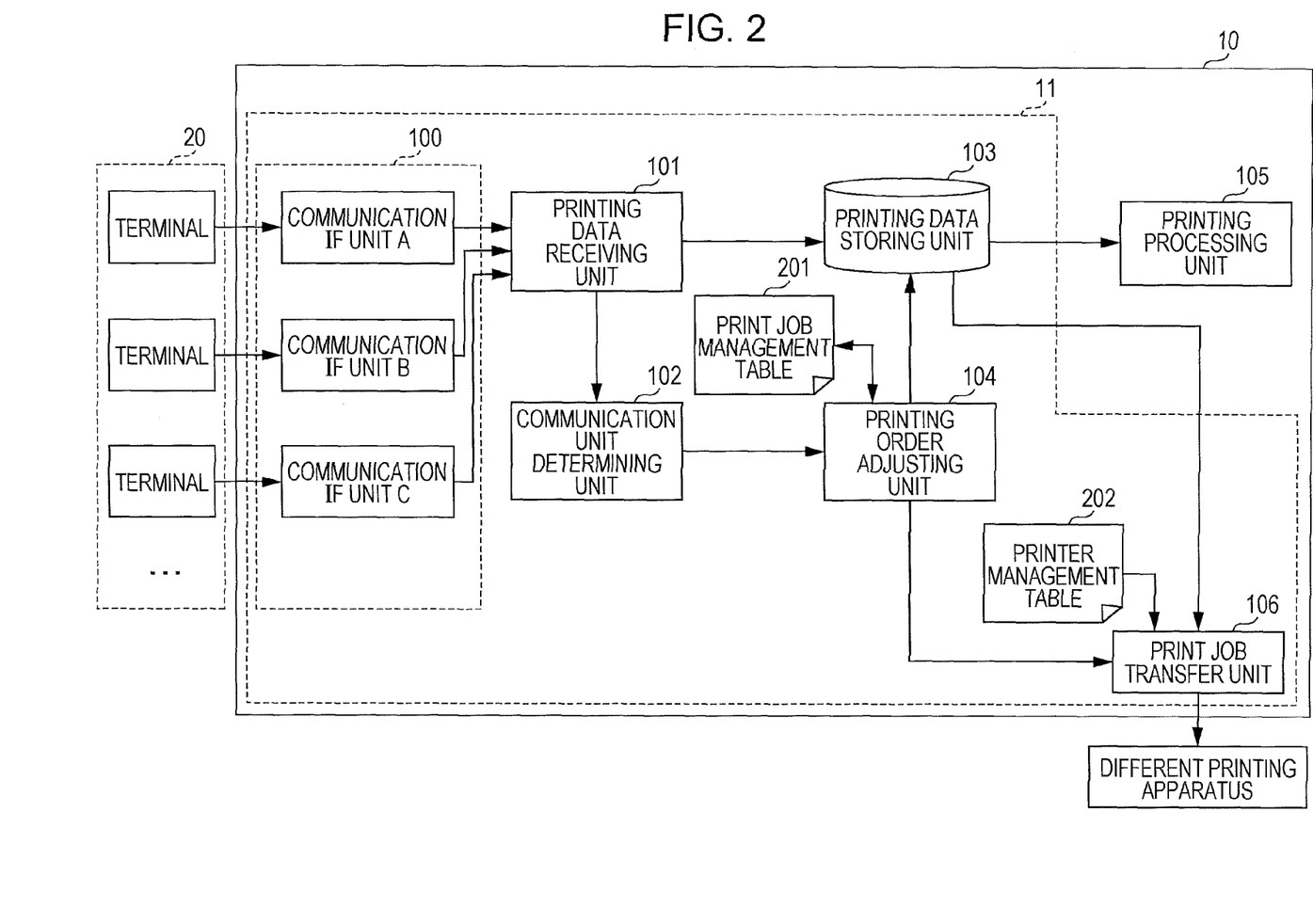
FIG. 2 is a diagram illustrating an example of a functional configuration of a printing apparatus according to the exemplary embodiment.

FIG. 2 is a diagram illustrating a functional configuration of the printing apparatus 10 according to this exemplary embodiment. The printing apparatus 10 according to this exemplary embodiment includes a communication unit 100 for communication with the terminals 20, a printing data receiving unit 101, a communication unit determining unit 102, a printing data storing unit 103, a printing order adjusting unit 104, a printing processing unit 105, and a print job transfer unit 106. In particular, parts other than the printing processing unit 105 may be referred to as a printing controller 11.

The printing data receiving unit 101 including plural communication units 100 receives, via the individual communication units, printing data transmitted from the plural terminals 20. The communication units 100 include communication interfaces (communication IFs) for the individual networks. For example, the wired network is controlled by a communication IF unit A, the wireless network 1 is controlled by a communication IF unit B, and the wireless network 2 is controlled by a communication IF unit C.

The communication unit determining unit 102 determines which one of the communication IF units A, B, and C was used when the printing data receiving unit 101 received printing data from a terminal 20. The communication units are associated with priority levels regarding the order of printing in advance. For example, priority level 1 is set to the wireless network 2, priority level 2 is set to the wireless network 1, and priority level 3 is set to the wired network. The wired network and the wireless network 1 may be associated with the same priority level as infra networks, without distinguishing between them.

The printing data storing unit 103 is a storing unit (may be called a spooler) for received printing data as print jobs to be stored in a built-in or external storage device. The order of printing (priority level) of a print job stored in the printing data storing unit 103 is determined according to the communication unit that received the corresponding printing data. If the priority levels of the communication units that received printing data are the same, corresponding print jobs are executed in the order in which the plural printing data were received.

The printing order adjusting unit 104 adjusts the order of printing of a print job in accordance with a communication unit determined by the communication unit determining unit 102. In particular, when a high priority level is set for a communication unit that received printing data (for example, a high priority level is set for the wireless network 2), the printing order adjusting unit 104 makes an adjustment such that printing is performed as early as possible. That is, the order of printing of printing data (first printing data) received via short-range radio communication is set to be higher than the order of printing of printing data (second printing data) stored in the printing data storing unit 103. The higher the order of printing, the earlier the data is output. The order of printing is determined in accordance with methods (a) and (b) described below.

(a) In the case where a print job which is currently being printed is normal printing (not authentication printing), after the print job which is currently being printed is completed, a received print job is placed immediately after the print job. Alternatively, the print job which is currently being printed is interrupted, and a received print job is placed in the middle of the interrupted print job.

(b) In the case where a print job which is currently being printed and the subsequent print job are authentication printing, since it is not desirable to mix these print jobs with a different print job, the different print job is placed subsequent to the authentication print jobs. For example, in the case where two pieces of printing data for authentication printing for the same user are scheduled to be consecutively printed, printing data received via short-range radio communication is printed after the authentication printing for the two pieces of printing data is completed.

Authentication printing represents a method in which in order to avoid mix-up, misplacement, peep, and theft of printed materials, a printing apparatus executes user authentication and then starts printing. For authentication printing, each user is not necessarily identified according to an IC card or the like. Authentication printing includes a method (may be called security printing) in which at a time when a printing instruction is issued from a terminal, a personal identification number, a password, or the like is assigned to a printing document, and at the time of printing, a printing apparatus starts printing by selecting the printing document and inputting the personal identification number or the like. The details of the case where the print job which is currently being executed is authentication printing, will be described later with reference to figures.

Figure 3:
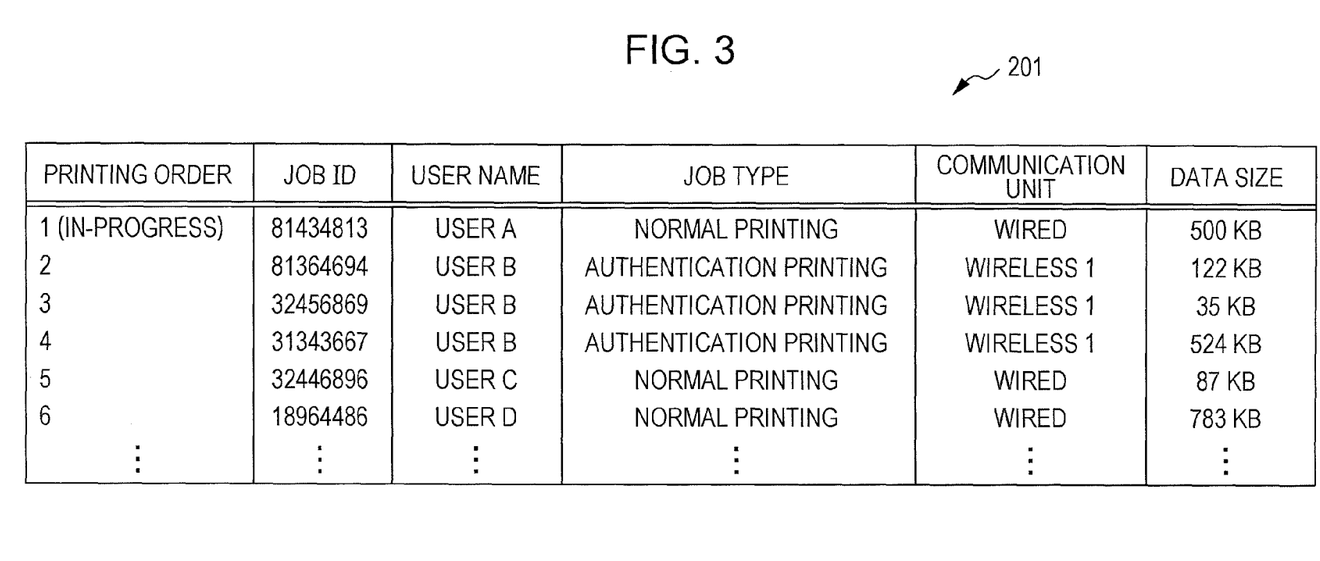
FIG. 3 is a diagram illustrating an example of a print job management table.

The printing order adjusting unit 104 includes a print job management table 201 which manages print jobs. FIG. 3 is a diagram illustrating an example of the print job management table 201. As illustrated in FIG. 3, the print job management table 201 includes a number indicating the order of printing, a job ID (job identifier) of a print job, a user name (user identifier), a job type, a communication unit which received printing data, and a data size. The job type represents information indicating whether a job is the above-mentioned authentication printing or normal printing. The communication unit represents information indicating a communication unit which received printing data of a print job. Information indicating a communication unit is, for example, wired (wired network), wireless 1 (wireless network 1 through an access point), wireless 2 (ad-hoc wireless network 2), and the like.

When a user is able to be identified by an IC card or the like, the IC card may be used as the user ID. When a user is not able to be identified, print jobs having the same personal identification number or the like may be regarded as the same user. The data size represents the size of a print job transmitted from a terminal. The data size may be the size of data, such as a page description language (PDL), before conversion into a raster image or the size of data after conversion into a raster image by a terminal. In addition, although not illustrated in FIG. 3 in particular, the print job management table 201 may further include information of the number of printing pages, printing settings, such as designation of monochrome printing or color printing (including gray scales and the number of colors), designation of double-sided printing and N-UP (function to print N pages in a single sheet), designation of the size of paper, and the like. The print job management table 201 may be stored in the printing data storing unit 103.

Referring back to FIG. 2, the printing processing unit 105 sequentially reads data from the printing data storing unit 103, and executes print jobs in accordance with the order of printing adjusted by the printing order adjusting unit 104. That is, the printing processing unit 105 executes printing processing of print jobs in accordance with the order of printing stored in the print job management table 201.

When interruption of a print job occurs in accordance with a determination of the order of printing by the printing order adjusting unit 104, the print job transfer unit 106 determines whether or not an interrupted print job is able to be transferred to a different printing apparatus. When the interrupted print job is able to be transferred to a different printing apparatus, the print job transfer unit 106 transfers the interrupted print job to the different printing apparatus. The determination of whether or not the interrupted print job is able to be transferred to a different printing apparatus is performed on the basis of printing settings of the interrupted print job, the size of the data, and information of the different printing apparatus (printing functions and the size of data of stored print jobs). Therefore, the print job transfer unit 106 shares a printer management table 202, which manages printing functions and status of a different printing apparatus, with the different printing apparatus. The printer management table 202 itself may be present on a server for managing all the printing apparatuses over a network.

Figure 4:
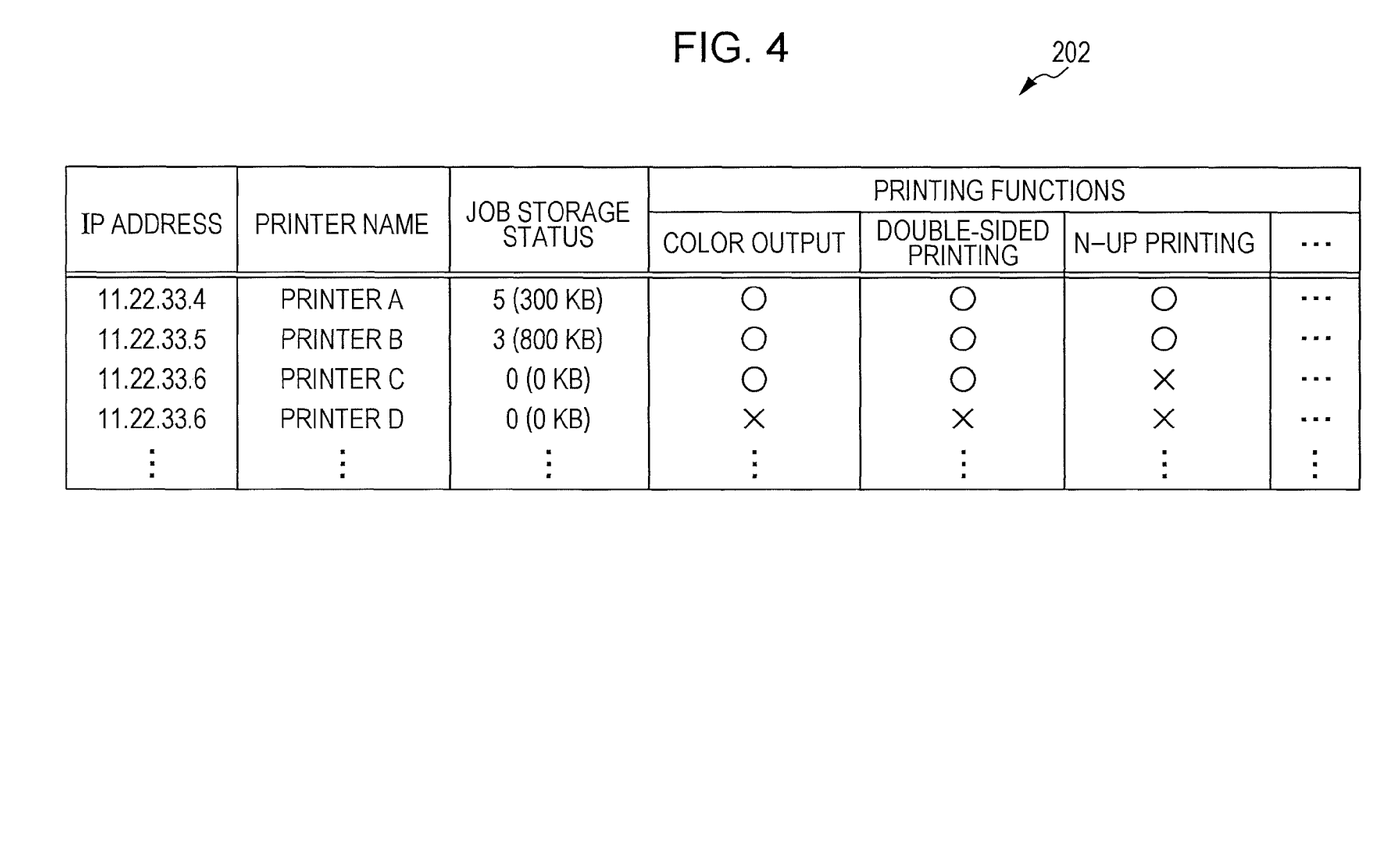
FIG. 4 is a diagram illustrating an example of a printer management table.

FIG. 4 is a diagram illustrating an example of the printer management table 202. The printer management table 202 includes information of an IP address, a printer name (printer identifier), a job storage status, and printing functions of each printing apparatus. The printing functions include information of printing functions provided in a printing apparatus, such as the availability and details of color output, double-sided printing, and N-UP printing. The printer management table 202 may be managed by the printing order adjusting unit 104, and only when a printing apparatus to which a print job is able to be transferred is found, the printer management table 202 may be controlled by the print job transfer unit 106.

By checking the job storage status in the printer management table 202 for information of the number of print jobs and the amount of data of the print jobs which have already been stored in a printing apparatus, the print job transfer unit 106 determines an optimal printing apparatus to which an interrupted print job is able to be transferred, so that the transferred print job is able to be executed as quickly as possible. Furthermore, the print job transfer unit 106 checks printing settings of the print job to be transferred and functions of the printing apparatus to which the print job is to be transferred, so that the transferred print job is able to be correctly printed by the printing apparatus to which the print job is transferred. In the case where no printing apparatus which supports the printing settings of the print job to be transferred is found or in the case where the total printing time at the original printing apparatus is shorter than the printing time at the found printing apparatus, transfer of the print job is not performed. Furthermore, in the case where transfer itself is not supported in the setting of the system or the like, transfer is not performed.

The functional configuration of the printing apparatus 10 described above is merely an example. One functional block (a processing unit and a database) may be divided into plural functional blocks or plural functional blocks may be integrated together as a single functional block. Each processing unit may be implemented when a central processing unit (CPU) built in an apparatus reads a program stored in a storage device, such as a read only memory (ROM), a flash memory, a solid state drive (SSD), or a hard disk, or a program supplied from a storage medium, such as a compact disc (CD) or a digital versatile disc (DVD), and executes the program. That is, each processing unit functions when a computer executes a program to read and write necessary data, such as a table, from and to a database (DB) stored in the storage device or a storage area of a memory or the like and to control related hardware (for example, an input/output device, a display device, a communication interface device, etc.). The program may be supplied from the above-mentioned storage medium or may be downloaded from the outside via a network.

Processing Flow

Figure 5:
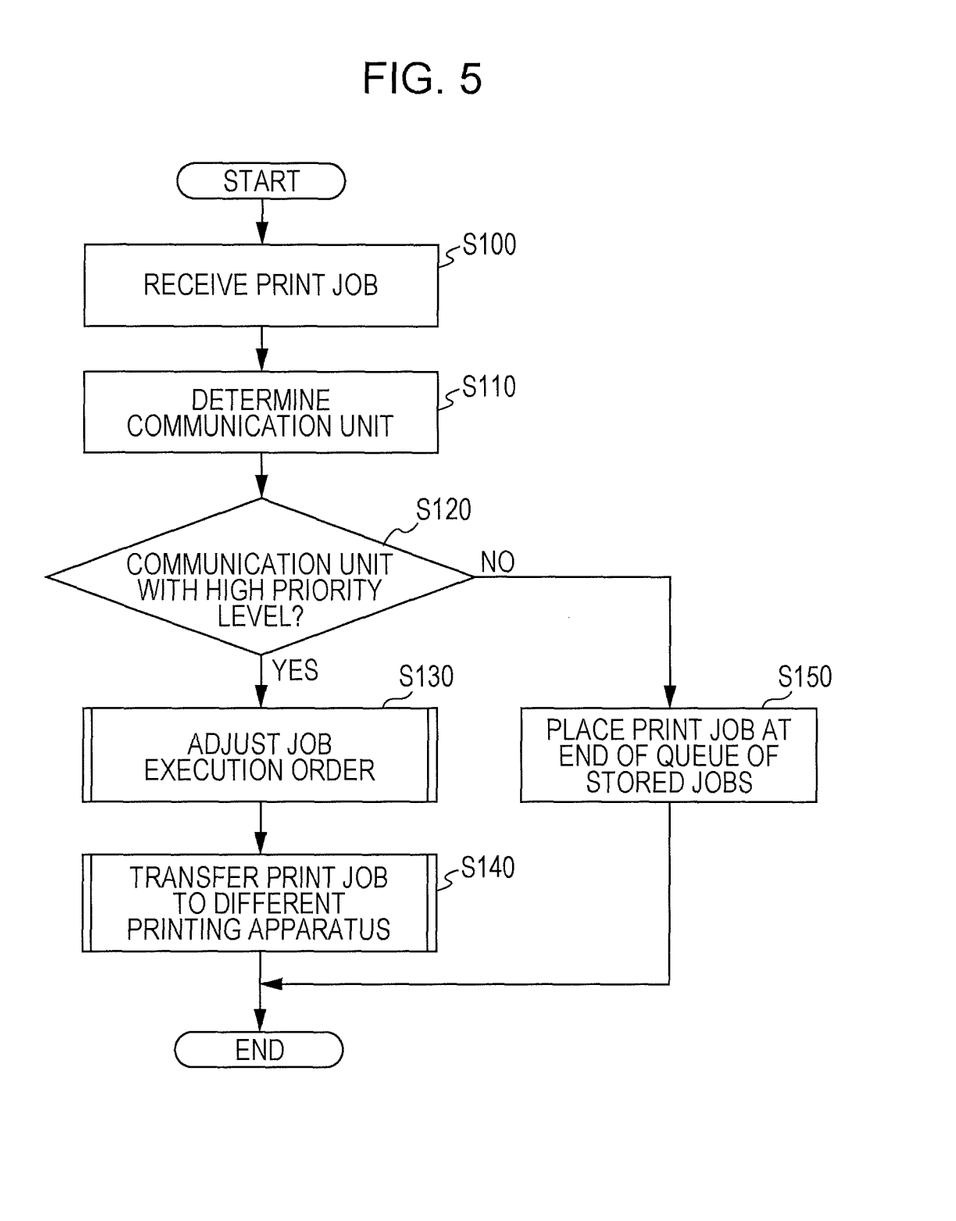
FIG. 5 is a flowchart illustrating the flow of the entire process of a print job according to the exemplary embodiment.

FIG. 5 is a flowchart illustrating the flow of the entire process of a print job according to this exemplary embodiment. In step S100, the printing data receiving unit 101 receives printing data and receives a print job. Next, in step S110, the communication unit determining unit 102 determines a communication unit through which the printing data receiving unit 101 received the print job. In step S120, it is determined whether the communication unit is a communication unit with a high priority level (for example, wireless direct). When the communication unit is not a communication unit with a high priority level, the process proceeds to step S150, and the printing order adjusting unit 104 places the received print job at the end of a queue of stored jobs in the printing data storing unit 103.

Figure 8A:
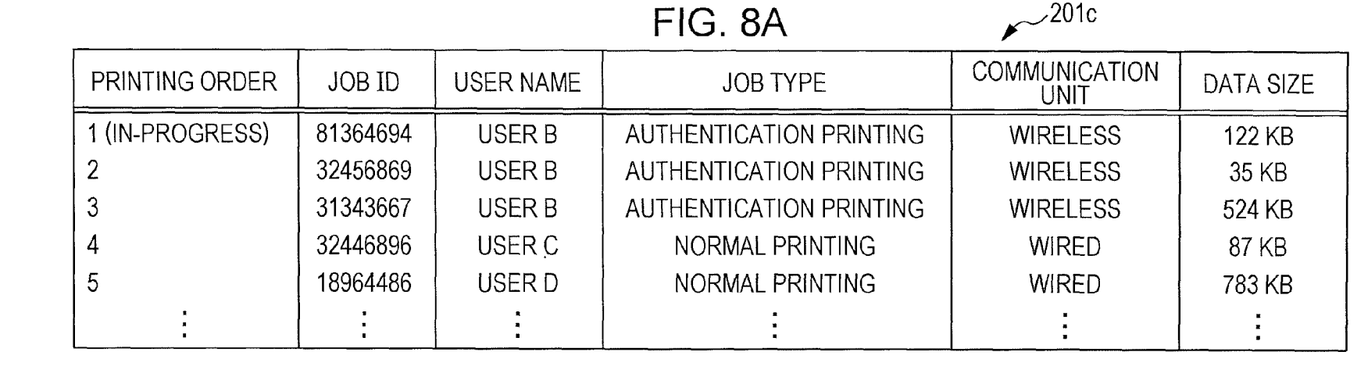
FIGS. 8A and 8B illustrate an example of changes in the state of the print job management table.

When it is determined in step S120 that the communication unit is a communication unit with a high priority level, the process proceeds to step S130, and the printing order adjusting unit 104 performs processing for adjusting the order of execution of print jobs. The details of the processing of step S130 will be explained later with reference to FIG. 6. After the determination regarding the execution order in step S130 is completed, processing for transferring the print job to a different printer is performed in step S140. The details of the processing of step S140 will be explained later with reference to FIG. 8.

Figure 6:
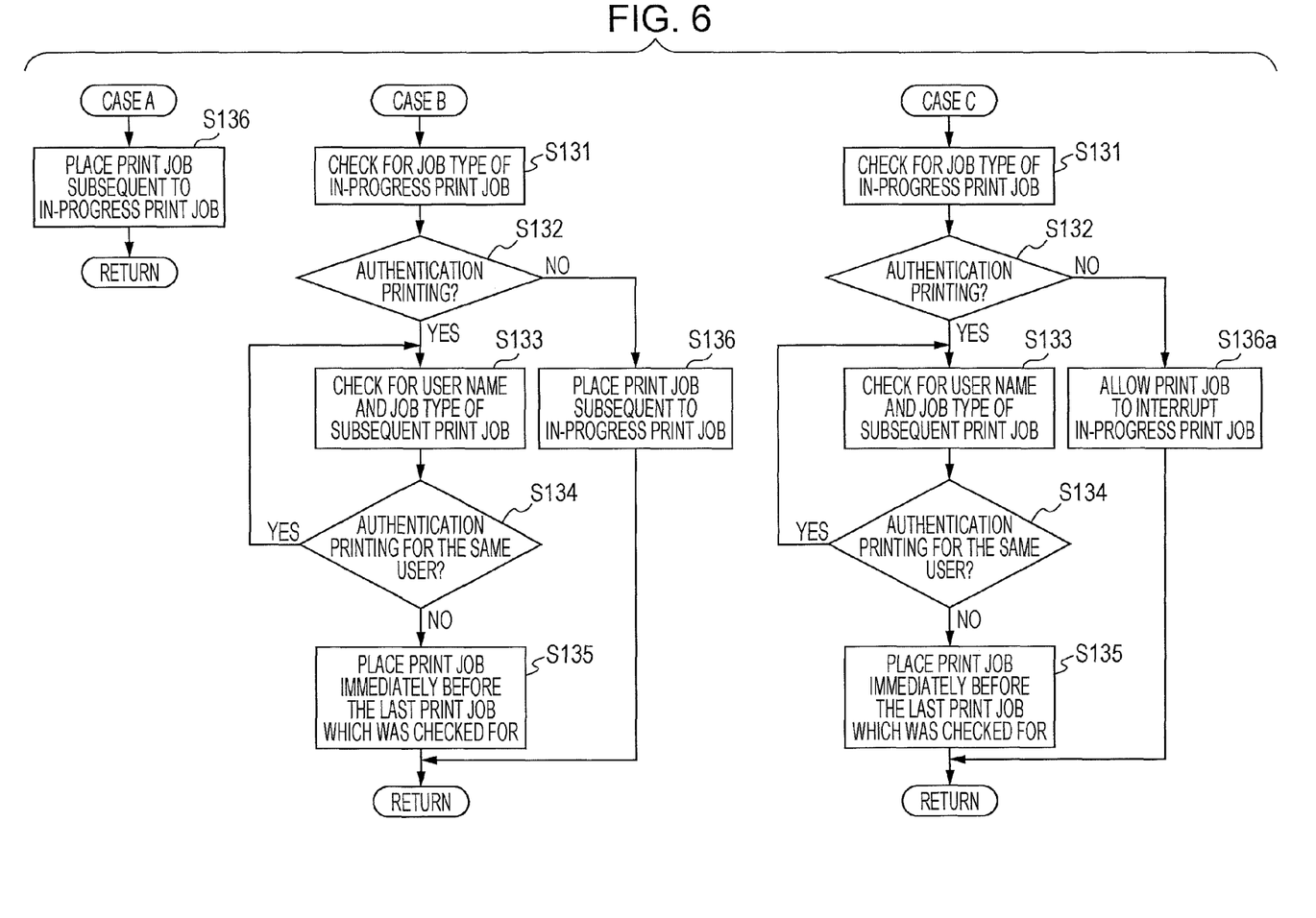
FIG. 6 is a flowchart illustrating the flow of a process for the order of execution of print jobs according to the exemplary embodiment.

FIG. 6 is a flowchart illustrating the flow of a process for determining the order of execution of print jobs according to this exemplary embodiment. This processing flow has three cases (operation modes). In case A, a received print job is simply placed subsequent to the print job which is currently being executed, without checking for a job type (step S136). The case A is effective under an environment which does not support authentication printing.

In case B, first in step S131, the job type of the print job which is currently being executed is checked for. When the job type is authentication printing (step S132: YES), the process proceeds to step S133, and the user name (user identifier) and the job type of the subsequent print job are checked for. Based on the result of the determination in step S133, when the subsequent print job is also requested from the same user as the print job which is currently being executed and the job type of the subsequent print job is authentication printing (step S134: YES), the process returns to step S133, and the user name and the job type of the further subsequent print job are checked for. When the further subsequent print job is not requested from the same user or the job type of the further subsequent print job is not authentication printing (step S134: NO), the process proceeds to step S135, and the received print job is placed immediately before the last print job that was checked for. That is, in determination of the position to which a print job is to be placed, when the job type of preceding consecutive print jobs is authentication printing for the same user, another print job is not allowed to be placed in between the print jobs. When it is determined in step S132 that the job type is not authentication printing, the process proceeds to step S136, and the received print job is placed subsequent to the print job which is currently being executed.

In case C, the processing from steps S131 to S135 is completely the same as in the case B. However, in step S136*a*, unlike the case B, the print job which is being executed is interrupted and replaced by the received print job. When the print job which is currently being executed is authentication printing, interrupting the print job and replacing the print job by a different print job does not occur. Under an environment which supports authentication processing, the case B or the case C is selectable.

Figure 7A:
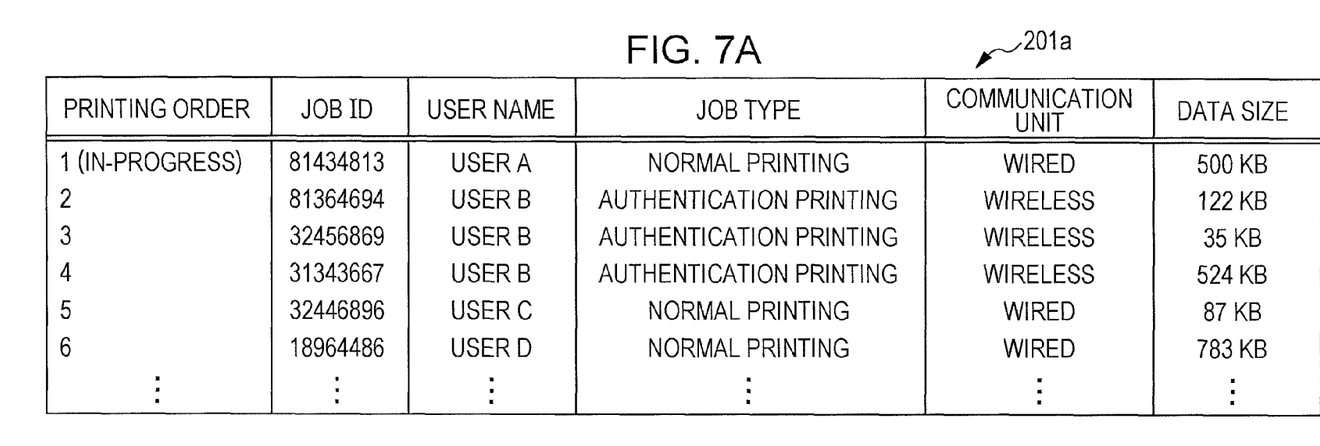
FIGS. 7A and 7B illustrate an example of changes in the state of the print job management table.
Figure 7B:
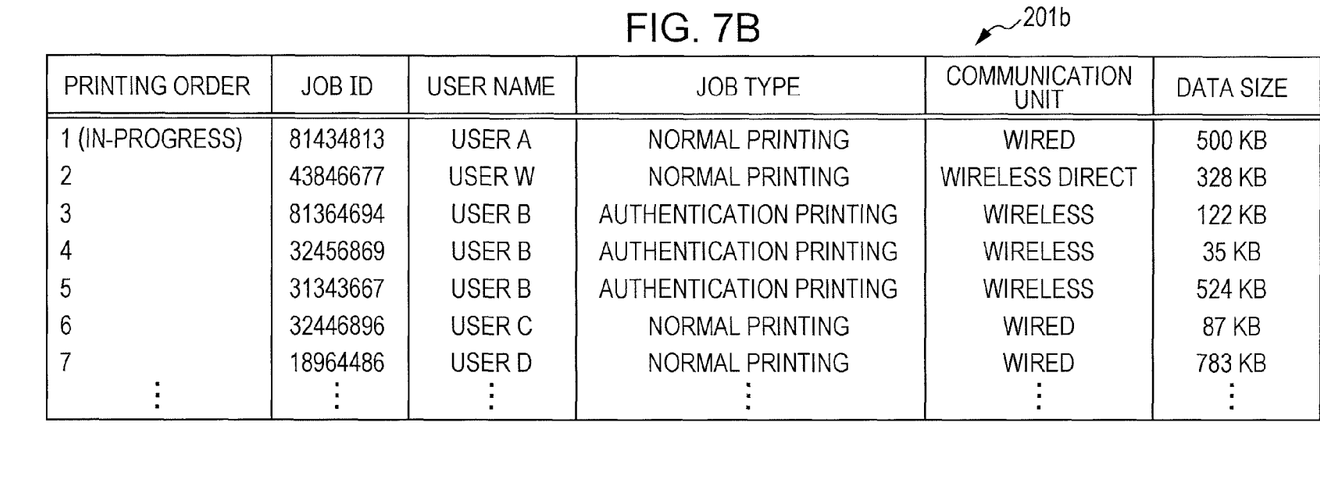

FIGS. 7A, 7B, 8A, and 8B illustrate examples of changes in the state of the print job management table 201. FIG. 7A illustrates the state of the print job management table 201 before receiving a print job, and FIG. 7B illustrates the state of the print job management table 201 after the received print job is caused to interrupt the queue of print jobs in the print job management table 201. This example illustrates a case where a newly received print job for a user W (normal printing by wireless direct) is placed immediately after a print job for a user A.

Figure 8B:
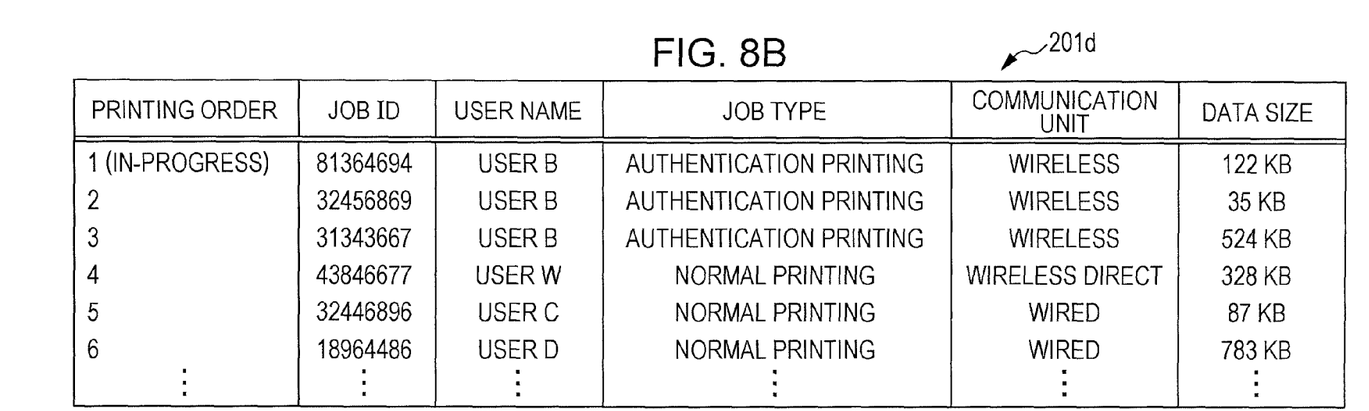

FIG. 8A illustrates that the state of the print job management table 201 illustrated in FIG. 7A has been changed into the state of the print job management table 201 at the time when the printing for the user A ends. FIG. 8B illustrates that the state of the print job management table 201 illustrated in FIG. 8A has been changed into the state after the newly received print job for the user W (likewise, normal printing by wireless direct) is caused to interrupt the queue of print jobs. In this example, since all the print job which is currently being executed and the subsequent two print jobs are authentication printing for the user B, the print job for the user W is placed in the fourth position, not in the second position, in the queue.

Figure 9:
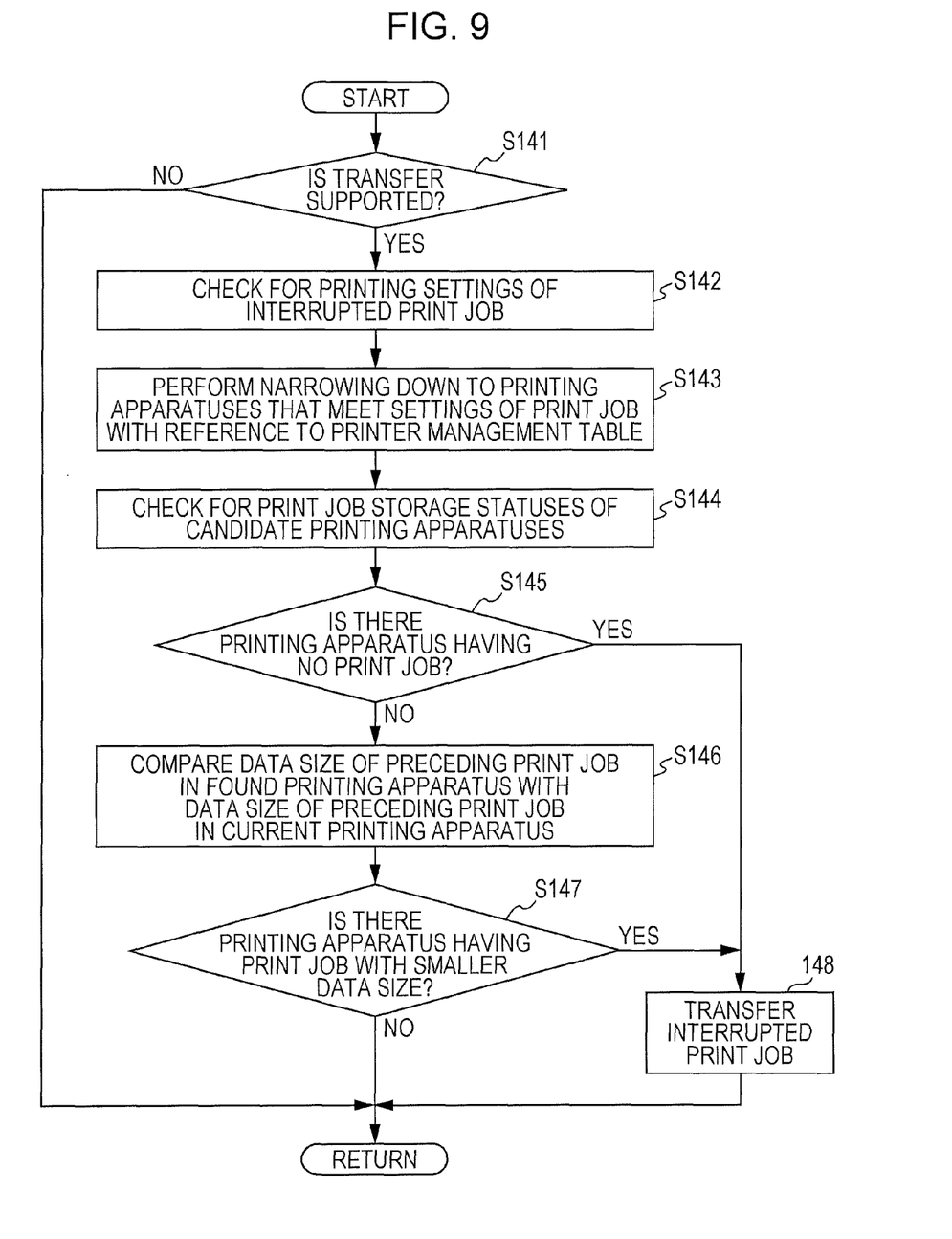
FIG. 9 is a flowchart illustrating the flow of a process at the time of transfer of a print job according to the exemplary embodiment.

FIG. 9 is a flowchart illustrating the flow of a process at the time of transfer of a print job according to this exemplary embodiment. This processing flow is the detailed flow of transfer of the print job in step S140 explained with reference to FIG. 5.

First, in step S141, the print job transfer unit 106 determines whether or not transfer is supported. The determination of whether or not transfer is supported is made by determining whether, under an environment in which plural printing apparatuses are connected to a network of the system, a setting is performed such that a system administrator is able to permit transfer or all or part of settings of the connected printing apparatuses are performed such that transfer is permitted. When transfer is not supported, no processing is performed in this processing flow.

In the case where transfer is supported, printing settings (monochrome/color printing, single-sided/double-sided printing, size of paper, etc.) of the interrupted print job are checked for in step S142. Next, in step S143, narrowing down to printing apparatuses that meet the printing settings of the interrupted print job is performed by referring to the printer management table 202. For example, if a setting of the interrupted print job is color printing, a printing apparatus which supports only monochrome printing is excluded from candidates for a transfer destination. In step S144, the print job storage statuses of the candidate printing apparatuses are checked for.

Based on a result of the checking for the print job storage statuses, when there is a printing apparatus in which the number of preceding print jobs is zero (that is, a printing apparatus in an empty state), the interrupted print job is transferred to the printing apparatus in step S148. When there is no printing apparatus in which the number of preceding print jobs is zero (there is no printing apparatus in the empty state), the data size of the preceding print job of the printing apparatus is compared with the data size of the preceding print job of the current printing apparatus in step S146. When there is a printing apparatus in which only a print job having a data size smaller than the data size of the interrupted print job of the current printing apparatus is stored (step S147: YES), the interrupted print job is transferred to the printing apparatus (step S148). Based on the result of the comparison, when there is no printing apparatus in which a print job having a data size smaller than the data size of the interrupted print job is stored (step S147: NO), it is determined that transfer requires a longer printing time, and the process is ended without performing transfer.

Variations of Exemplary Embodiment

In the foregoing exemplary embodiment, a wired network and wireless communication units (through an access point and ad-hoc type) have been described as communication units to be determined by the communication unit determining unit 102. However, the communication units may be expanded to a connection unit used in a case where printing is directly performed, without using any terminal, from a universal serial bus (USB) memory provided with a USB interface, a secure digital (SD) memory card, a miniSD card, a device such as a digital camera, or the like. In this case, printing data may be input from a connection unit without through a network to the printing data receiving unit 101. At this time, a print job is received when a user selects a document, an image, or the like to be printed through an operation panel or the like of the printing apparatus 10.

Furthermore, in the foregoing exemplary embodiment, the printing apparatus 10 is directly connected to a network, and the printing controller 11 which controls the order of printing is provided within the printing apparatus 10. However, the configuration of the printing apparatus 10 is not limited to this. For example, the printing controller 11 may be configured to be a computer (printer server), such as a personal computer, including plural communication units over a network, and the printing processing unit 105 may be configured to be a printer locally connected to the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
   a printing data storing unit that stores received printing data; and
   a printing order adjusting unit that adjusts an order of printing of printing data received through short-range radio communication to be higher than an order of printing of printing data stored in the printing data storing unit,
   wherein in a case where printing of second printing data is scheduled to be performed after completion of printing of first printing data and printing data is received through the short-range radio communication during the printing of the first printing data, the printing order adjusting unit causes printing of the printing data received through the short-range radio communication to be performed prior to the printing of the second printing data,
   wherein the short-range radio communication is communication using a network that is used by a user who is not authorized to be connected to a primary network that transmits the received printing data to be stored,
   wherein when printing data that is currently printing is non-authentication printing, the printing data received through the short-range radio communication is placed in the order immediately after the currently printing data, and
   wherein when printing data that is currently printing is authentication printing and printing data immediately after the currently printing data in the order is also authentication printing, the printing data received through the short-range communication is place in the order subsequent to the printing data immediately after the current printing data.

2. The printing apparatus according to claim 1, wherein in a case where printing data is received through the short-range radio communication during printing of first printing data, the printing order adjusting unit causes the printing of the first printing data to be interrupted and causes printing of the printing data received through the short-range radio communication to be performed.

3. The printing apparatus according to claim 1, wherein in a case where printing of two pieces of printing data for authentication printing for a same user is scheduled to be consecutively performed, the printing order adjusting unit causes printing of the printing data received through the short-range radio communication to be performed after the printing of the two pieces of printing data is completed.

4. The printing apparatus according to claim 1, further comprising:
   a print job transfer unit that transfers, in a case where interruption of a print job occurs due to the adjustment by the printing order adjusting unit, an interrupted print job to a different printing apparatus, when a data size of the interrupted print job is smaller than a data size of a printing function of the different printing apparatus and a print job stored in the different printing apparatus.

5. The printing apparatus according to claim 1, further comprising:
   a print job transfer unit that transfers, in a case where interruption of a print job occurs due to the adjustment by the printing order adjusting unit, an interrupted print job to a different printing apparatus, when a printing function of the different printing apparatus satisfies a printing setting of the interrupted print job and a data size of a print job stored in the different printing apparatus is smaller than a data size of the interrupted print job of the current printing apparatus.

6. A printing method comprising:

storing received printing data;

adjusting an order of printing of printing data received through short-range radio communication to be higher than an order of printing of stored printing data; and in a case where printing of second printing data is scheduled to be performed after completion of printing of first printing data and printing data is received through the short-range radio communication during the printing of the first printing data, causing printing of the printing data received through the short-range radio communication to be performed prior to the printing of the second printing data, wherein the short-range radio communication is communication using a network that is used by a user who is not authorized to be connected to a primary network that transmits the received printing data to be stored, wherein when printing data that is currently printing is non-authentication printing, the printing data received through the short-range radio communication is placed in the order immediately after the currently printing data, and wherein when printing data that is currently printing is authentication printing and printing data immediately after the currently printing data in the order is also authentication printing, the printing data received through the short-range communication is placed in the order subsequent to the printing data immediately after the current printing data.

7. A non-transitory computer readable medium storing a program causing a computer to execute a process for printing, the process comprising:

storing received printing data;

adjusting an order of printing of printing data received through short-range radio communication to be higher than an order of printing of stored printing data; and in a case where printing of second printing data is scheduled to be performed after completion of printing of first printing data and printing data is received through the short-range radio communication during the printing of the first printing data, causing printing of the printing data received through the short-range radio communication to be performed prior to the printing of the second printing data, wherein the short-range radio communication is communication using a network that is used by a user who is not authorized to be connected to a primary network that transmits the received printing data to be stored, wherein when printing data that is currently printing is non-authentication printing, the printing data received through the short-range radio communication is placed in the order immediately after the currently printing data, and wherein when printing data that is currently printing is authentication printing and printing data immediately after the currently printing data in the order is also authentication printing, the printing data received through the short-range communication is placed in the order subsequent to the printing data immediately after the current printing data.

* * * * *